US008839445B2

(12) United States Patent
Tarrago et al.

(10) Patent No.: US 8,839,445 B2
(45) Date of Patent: Sep. 16, 2014

(54) METHOD AND DEVICE FOR SECURELY TRANSFERRING DIGITAL DATA

(75) Inventors: Arnaud Tarrago, Paris (FR); Pascal Sitbon, Chatillon (FR); Pierre N'guyen, Montrouge (FR)

(73) Assignee: Electricite de France, Paris (FR)

( * ) Notice: Subject to any disclaimer, the term of this patent is extended or adjusted under 35 U.S.C. 154(b) by 193 days.

(21) Appl. No.: 13/140,551

(22) PCT Filed: Dec. 17, 2009

(86) PCT No.: PCT/FR2009/052600
§ 371 (c)(1),
(2), (4) Date: Jun. 17, 2011

(87) PCT Pub. No.: WO2010/076514
PCT Pub. Date: Jul. 8, 2010

(65) Prior Publication Data
US 2011/0252481 A1    Oct. 13, 2011

(30) Foreign Application Priority Data
Dec. 18, 2008   (FR) ..................................... 08 58790

(51) Int. Cl.
*H04L 9/00*   (2006.01)
(52) U.S. Cl.
USPC ................. 726/26; 726/31; 710/33; 707/609; 707/615; 707/627; 707/634; 707/655; 707/657
(58) Field of Classification Search
USPC ......... 726/26, 31; 710/33, 609; 707/715, 627, 707/634, 655.657
See application file for complete search history.

(56) References Cited

U.S. PATENT DOCUMENTS

| | | | | |
|---|---|---|---|---|
| 5,673,318 A * | 9/1997 | Bellare et al. | ................. | 713/170 |
| 5,832,228 A | 11/1998 | Holden et al. | | |
| 6,772,278 B2 * | 8/2004 | Toda | .............................. | 711/105 |
| 7,707,188 B2 * | 4/2010 | Pandya et al. | ................. | 707/668 |
| 7,921,244 B2 * | 4/2011 | Chang et al. | ..................... | 710/62 |
| 2005/0021600 A1 | 1/2005 | Lagosanto et al. | | |
| 2009/0179894 A1 * | 7/2009 | Bakalash et al. | .............. | 345/422 |
| 2010/0031056 A1 * | 2/2010 | Harada | ......................... | 713/193 |

FOREIGN PATENT DOCUMENTS

| | | |
|---|---|---|
| FR | 2 828 358 A1 | 2/2003 |
| WO | WO 96/18253 A1 | 6/1996 |
| WO | WO 00/16206 A1 | 3/2000 |
| WO | WO 03/079629 A1 | 9/2003 |

* cited by examiner

*Primary Examiner* — Mohammad A Siddiqi
(74) *Attorney, Agent, or Firm* — Drinker Biddle & Reath LLP (57) ABSTRACT

A device is provided for securely transferring digital data between at least one first computer system and at least one second computer system, including a controller that connects to at least one data store, a first transfer device connected to the controller and that receives the digital data from the first computer system and sends the data to the controller, a second transfer device connected to the controller and that receives the digital data from the controller and sends the data to the second computer system, and which is managed independently from the first transfer device. A corresponding transfer method and media containing a computer program are also provided.

17 Claims, 5 Drawing Sheets

METHOD AND DEVICE FOR SECURELY TRANSFERRING DIGITAL DATA

CROSS-REFERENCE TO RELATED APPLICATIONS

This application is the U.S. national phase of the International Patent Application No. PCT/FR2009/052600 filed Dec. 17, 2009, which claims the benefit of French Application No. 08 58790 filed Dec. 18, 2008, the entire content of which is incorporated herein by reference.

FIELD OF THE INVENTION

The invention relates to the field of securely transferring digital data.

BACKGROUND

The protection of data networks is currently provided by devices the security of which depends on the security of their implementation and the correct compliance with communication protocols. This is particularly the case for "firewall" devices, application relays or products segmenting the networks (such as VLAN products or the 802.IQ standard), as well as systems for the detection and prevention of intrusion.

Several types of secure architectures can exist. In highly secure architectures, network interconnections are prohibited. Exchanges are carried out using physical elements that are attached from system to system. Unidirectional communication exchange devices exist but their reliability is limited because of the lack of exchange of control flows. This is the case of "physical diode" devices mostly based on fibre optic technologies.

Figure 1A:
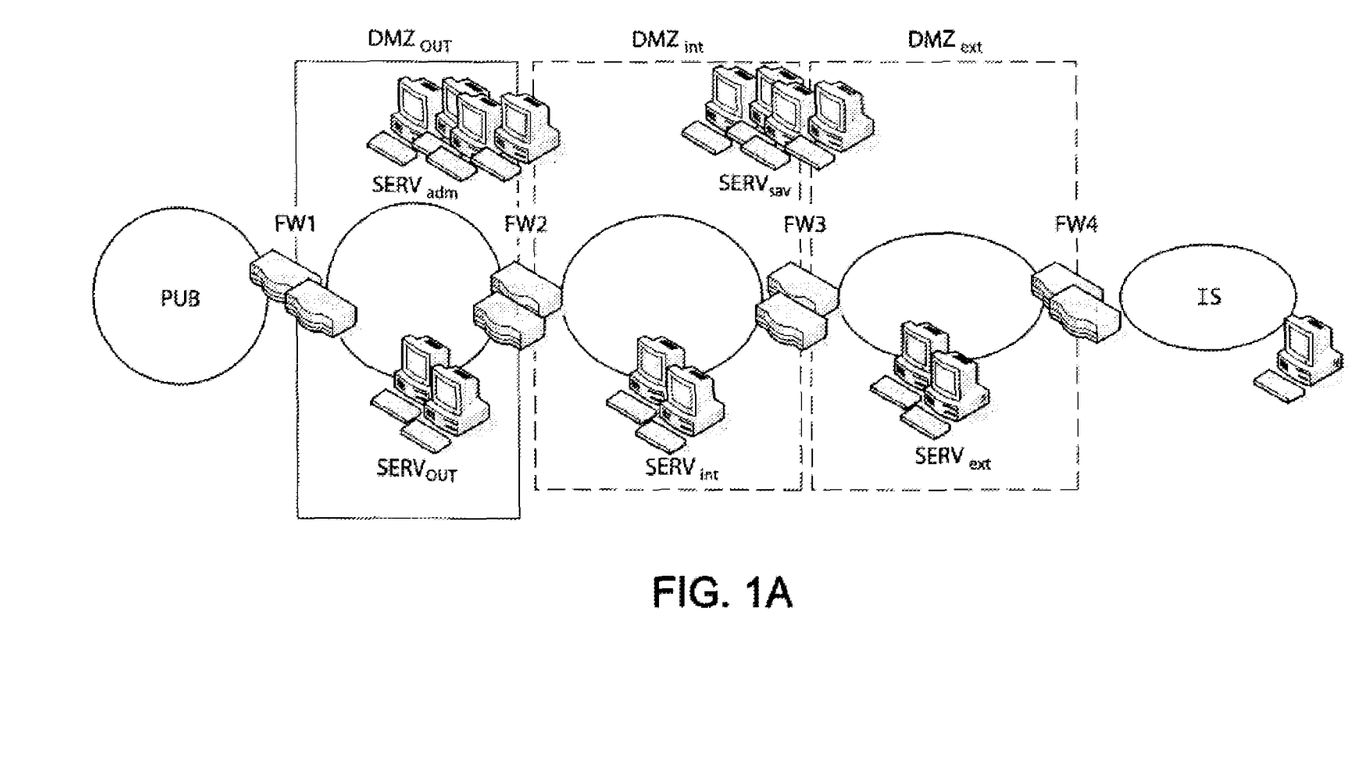
FIGS. 1A and 1B show examples of ideal and conventional secure exchange architecture.

An example of an ideal secure exchange architecture is shown in FIG. 1A. In the network shown in this figure, access to the data system IS from a system having a different level of confidence, in this case a public network PUB, is carried out via firewalls $FW_1$, $FW_2$, $FW_3$, $FW_4$ delimiting an external exchange zone $DMZ_{out}$, an internal exchange zone $DMZ_{int}$ and an extended exchange zone $DMZ_{ext}$ respectively managed by dedicated servers $SERV_{out}$, $SERV_{in}$ and $SERV_{ext}$. Additional servers $SERV_{adm}$ and $SERV_{sav}$ are used for administrative and saving operations respectively. The multiplication of these exchange zones allows the task of a possible malicious user wishing to gain access or even to corrupt certain data of the data system IS to be made more complex.

Figure 1B:
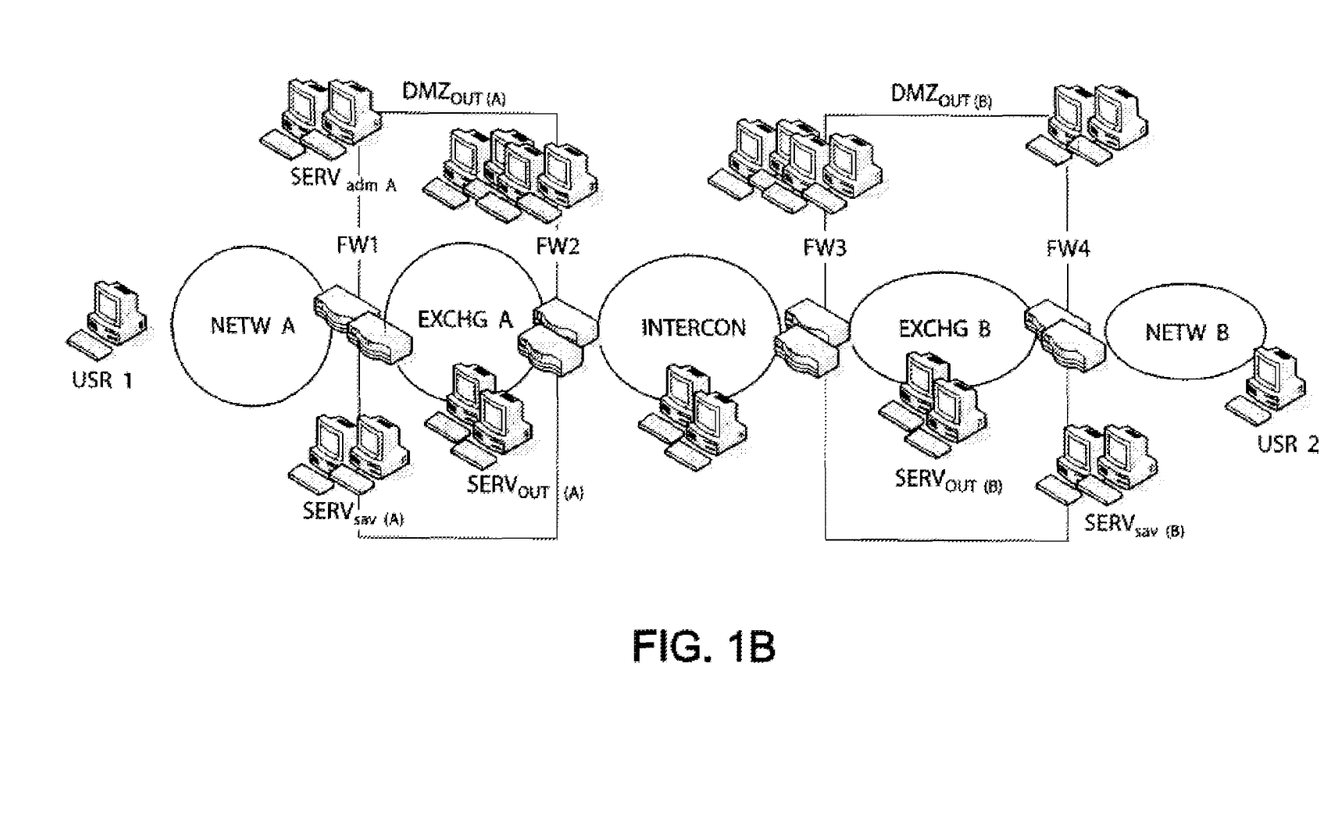

Another "conventional" example of secure exchange architecture is shown in FIG. 1B. It again uses the "exchange zone" concept previously defined in "ideal" exchange architectures, but simplifies it to the extreme in order to have no more than one or two exchange zones $DMZ_{out}(A)$ and $DMZ_{out}(B)$.

However, many software faults have been noted in this type of architecture, then resulting in compromising the network which it was supposed to protect. The "ideal" architectures have, for example, been vulnerable to attacks on applications using web-services. The conventional architectures are themselves vulnerable to any use of hidden channels (declaration of use of a given protocol in order to mask the real use of another protocol or of a protocol highjack).

Independently of this problem of software security, a poor application of a company's security policy or an error in the configuration of such devices can compromise the security of the entire network. These errors therefore necessitate monitoring and procedures for audits and continuous upgrading of such devices.

SUMMARY

The present invention aims to improve the situation.

For this purpose it proposes a method for securely transferring an item of digital data, from at least a first computer system to at least a second computer system, comprising a first stage of transferring the digital data item originating from the first computer system to a control means of a transfer device, then a stage of writing the digital data item received by the control means into a storage means, a stage of reading the digital data item stored in the storage means by the control means, and a second transfer stage, managed independently from the first transfer, of the digital data item from the control means to the second computer system.

Advantageously, the first transfer stage comprises an initial transfer stage, managed by at least a first internal transfer interface of the transfer device, of the digital data item coming from the first computer system to a first processing means belonging to the transfer device, as well as an internal transfer stage, managed by a second internal transfer interface of the transfer device, independent from said first internal transfer interface, of the digital data item from the first processing means to the control means.

Thus, a possible malicious user who succeeds in taking control of the first interface will not directly have control of the second interface and will not be able to access digital data stored in the device.

Preferably, the first internal transfer interface uses a transfer technology which is different from the second internal transfer interface.

With such a difference in technological implementation, it is possible to ensure that a possible malicious user succeeding in taking control of the first interface does not directly obtain control of the second interface.

Advantageously, the initial transfer stage comprises an external transfer stage, managed by a transfer interface outside of the transfer device, of the digital data item from the first system to a first exchange means belonging to the transfer device, followed by an internal transfer stage, managed by the first internal transfer interface of the transfer device and independent from the external transfer interface, of the digital data item from said first exchange means to the first processing means.

Thus, a possible malicious user who succeeds in taking control of the external interface will not directly have control of the first interface and will not be able to access the digital data stored in the device or in the second computer system.

Preferably, the second transfer comprises an internal transfer stage, managed by a third internal transfer interface of the transfer device, of the digital data item coming from the control means to a second processing means belonging to the transfer device, followed by a final transfer stage, managed by at least a fourth internal transfer interface of the transfer device and independent of said third internal transfer interface, of the digital data item from said second processing means to the second computer system.

Thus, a possible malicious user who succeeds in taking control of the third interface would not directly have control of the fourth interface and will be hampered in his taking control of the transfer device.

Preferably, the third internal transfer interface uses a transfer technology which is different from the fourth internal transfer interface.

With such a difference in implementation technology, it is ensured that a possible malicious user succeeding in taking control of the third interface does not directly obtain control of the fourth interface.

Advantageously, the final transfer stage comprises an internal transfer stage, managed by a fourth internal transfer interface of the transfer device and independent from the third internal transfer interface, of the digital data item from the second processing means to a second exchange means belonging to the transfer device, followed by an external transfer stage, managed by at least a second transfer interface outside of the transfer device, of the digital data item from said second exchange means to the second computer system.

Thus, a possible malicious user who succeeds in taking control of the fourth internal transfer interface will not directly have control of the external interface and will not be able to access data located in the second computer system.

Advantageously, insofar as the digital data item is constituted by a plurality of symbols, the method can comprise, either between the first transfer and the writing stage, or between the reading stage and the second transfer, or in both cases, a stage of validation of the data item. Such a stage can moreover take place within the first transfer, between the initial transfer stage and the second internal transfer stage. It can also take place within the second transfer, between the third internal transfer stage and the final transfer stage. Such a validation stage consists of validating the data item according to at least one parameter relative to one of the symbols of the data item, or according to a parameter relative to metadata relating to that data item.

This validation stage makes it possible to verify that the transmitted data to be transferred are not manipulated by a malicious user. It also makes it possible to verify that the transmitted data to be transferred are harmless to the target computer system or that they do not introduce a computer risk in the target system.

Advantageously, each transfer interface can carry out only writing or reading operations of the digital data item.

By thus limiting the functions of the transfer interfaces, the exchanges between the device and the external systems are physically limited, which restricts the possibilities of action of a possible malicious user having taken control of one of the interfaces of the device.

The present invention also relates to a secure transfer device comprising a control means, capable of being connected to a storage means, a first transfer means, connected to the control means, capable of receiving the digital data item coming from the first computer system and of transmitting it to the control means, as well as a second transfer means, connected to the control means, capable of receiving the digital data item from the control means, in order to transmit it to the second computer system, and managed independently from the first transfer means.

Advantageously, the first transfer means comprises a first processing means, capable of receiving the digital data item coming from the first computer system via a first connection managed by a first internal transfer interface, and connected to the control means by means of a second connection managed by a second internal transfer interface independently from the first internal transfer interface.

The first transfer means can also comprise a first exchange means, connected to the first processing means by means of the first connection, and capable of receiving the digital data item coming from the first computer system by means of a first external transfer interface, managed independently from the first internal transfer interface.

Moreover, the second transfer means comprises a second processing means, connected to the control means by means of a third connection managed by a third internal transfer interface, and capable of sending the digital data item to the second computer system, by means of a fourth connection managed by a fourth internal transfer interface managed independently from the third internal transfer interface.

Preferably, the second transfer means comprises a second exchange means, connected to the second processing means by means of the fourth connection, and capable of sending the digital data item to the second computer system by means of a second external transfer interface, managed independently from the fourth internal transfer interface.

The secure transfer device can comprise either a storage means, connected to the control means, or a connection means, connected to said control means and capable of being connected to a storage means outside of the transfer device, in order to store the digital data item there.

Advantageously, the secure transfer device can comprise a first switch making it possible to choose between at least two operating states, the first operating state being a state in which the first processing means is capable of receiving the data item only from the first exchange means and of transmitting the data item only to the control means, and the second operating state being a state in which the first processing means is capable of receiving the data item only from the control means and of transmitting the data item only to the first exchange means.

Similarly, the device can comprise a second switch making it possible to choose between at least two operating states, the first operating state being a state in which the second processing means is capable of receiving a data item only from the second exchange means and of transmitting a data item only to the control means, and the second operating state being a state in which the second processing means is capable of receiving a data item only from the control means and of transmitting a data item only to the second exchange means.

With such switches, a qualified user can decide the direction of reading and writing of the data depending on the context of use, which adds an additional element of security.

Finally, the present relates to a computer program for the implementation of the method as described above. This program can be downloadable via a telecommunications network, intended to be stored in a memory of a transfer device, or stored on a memory medium intended to cooperate with a transfer device.

BRIEF DESCRIPTION OF THE DRAWINGS

Other features and advantages of the invention will become apparent on examination of the following detailed description and of the attached drawings in which.

DESCRIPTION OF PREFERRED EMBODIMENTS

Figure 2:
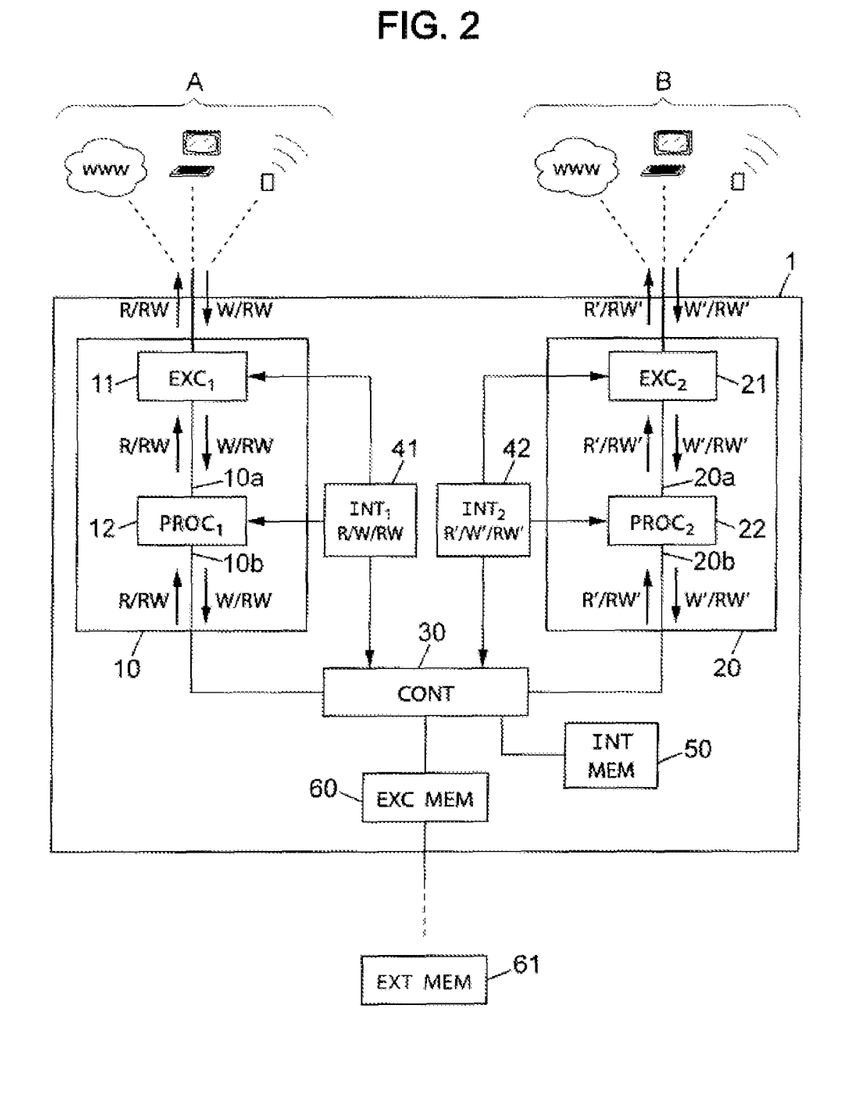
FIG. 2 shows a secure transfer device according to an embodiment of the present invention.

Reference is now made to FIG. 2 which shows a secure transfer device 1. This device is intended to be connected between at least a first computer system A and a second computer system B.

"Computer system" here refers to any system using digital data, such as a computer, a smartphone, a personal digital assistant (PDA), an actuator, a computer network or a sensor, such as shown in FIG. 2.

The device 1 comprises a first transfer means 10 connected to a control means 30, as well as a second transfer means 20 also connected to the control means 30.

The first transfer means 10 receives digital data coming from a first computer system A, in order to transfer them to the control means 30.

In order simplify the description of the invention, the transfer means 10 is shown here as having only one single input/output interface and of being able to be connected to only one computer system A at a time.

However, the device 1 can also be designed to receive data originating from several computer systems. In this case, the transfer means 10 can be configured in order to be able to receive data from these different systems, by means of a plurality of input/output interfaces. Each of these systems can also have, within the device 1, its own transfer means, similar to the transfer means 10, making it possible for it to transfer data to the control means 30.

Similarly, the second transfer means 20 receives digital data originating from the control means 30, in order to transfer it to a second computer system B, at the request of this system B. This transfer means 20 is here described as participating in the transfer of the data to a single computer system B, for reasons of simplicity.

However, the device 1 can also be designed for transferring data to several computer systems. In this case, the transfer means 20 can be configured to be able to transfer data to these different systems by means of a plurality of input/output interfaces, at the request of these systems. Each of these systems can also have, within the device 1, its own transfer means, similar to the transfer means 20, allowing it to receive data coming from the control means 30.

The first transfer means 10 and the second transfer means 20 are managed independently from each other, i.e. the transfer of a digital data item from the first computer system A to the second computer system B is carried out in two time periods. In a first time period, the transfer is carried out from the system A to the control means 30. In a second time period, this data item is transferred from the control means 30 to the second computer system B, at the request of the latter. This physical desynchronization between the two transfer means 10 and 20 prevents a malicious simultaneous taking control of these two transfer means and allows the transfer to be made secure in a physical way.

The control means 30 serves as an interface between the two transfer means 10 and 20, and makes it possible to ensure the independence of the latter. This control means 30 can be an electronic component which is programmable by software, such as for example an FPGA or a computer associated with an operating system, or it can be an electronic component programmed physically, by means of soldered cables, such as an ASIC component for example.

The control means 30 is connected to at least one means of storing digital data, and makes it possible to manage access to the latter, as well as the sharing of its storage space. This storage means can be inside the device 1, in the form of a digital storage memory 50, or outside of the device 1, in which case the device 1 comprises an interface 60 able to be connected to a storage space 61. The present invention is not limited to a single storage space, it is entirely possible to consider using several internal storage spaces 50, or several external storage spaces 61 or even any combination of internal 50 and external 61 storage spaces.

In order to manage access to the storage means 50 or 61, the control means 30 can have an on-board operating system which, advantageously, cannot be modified by one of the computer systems A or B, making it possible to change the reading and writing rights according to switches described below. This management of accessibility to the memory resource makes it possible to protect the latter from malicious actions attempted from the processing means 12 and 22, for example.

Moreover, the writing and reading of data by the control means 30 in a storage means makes it possible to ensure the physical desynchronization between the two transfer means 10 and 20, the data item to be transferred having first to be stored in memory, and then read, before being transferred by the second transfer means 20, at the request of the system B. This complicates the taking of control of the computer system B from a possible computer system A used in a malicious way.

The transfer means 10 comprises a first exchange means 11 connected to a first processing means 12 by a connection $10_a$. This first processing means 12 is itself connected to the control means 30 by means of a connection $10_b$. It can optionally be connected to a memory in order to obtain a physical desynchronization mechanism, similar to that of the control means 30, by the writing followed by the reading of the data item to be transferred.

The first exchange means 11 is used for connecting to the first computer system A and has a physical port which can be of the USB or S-ATA type, for example. Depending on the type of physical port used, the means 11 will comprise a controller of the corresponding technology, allowing only a certain limited number of defined instructions. These instructions can be fixed in such a way that they cannot be modified, by implementing them physically at the level of the controller. With such a means 11, the first computer system A, when it is connected to the device 1, will have the impression of accessing a storage space and will not know of the existence of the second computer system B.

The first processing means 12, like the control means 30, can be an electronic component which is programmable by means of software, such as for example an FPGA or a computer associated with an operating system, or an electronic component which is programmed physically by means of soldered cables, like an ASIC component for example.

This processing means 12 will receive the digital data from the exchange means 11 by a physical connection $10_a$, such as for example a memory bus, managed by an internal transfer interface of a certain type.

The first processing means 12 can validate the digital data, according to certain criteria described below, and prevent the digital data being transferred further in the device 1 if these validation criteria are not complied with.

In a first variant, if the validation criteria are not complied with, the first processing means 12 can allow the transfer of the digital data by modifying these data, and optionally the associated metadata, in order to make them harmless.

In another variant, again if the validation criteria are not complied with, the first processing means 12 can allow the transfer without modification of the digital data, whilst informing the destination computer system B of these data that the latter do not comply with the criteria.

The first processing means 12 is connected to the control means 30 by a physical connection $10_b$, for example a memory bus, managed by an internal transfer interface of a certain type, such as a USB, IDE, S-ATA or Flash interface for example. Advantageously, the type of interface used here is different from that of the interface between the first exchange means 11 and the first processing means 12, in order to prevent a malicious action compatible with only this type of transfer interface. For this purpose, these two transfer interfaces must act independently. It is for example possible to achieve this by physically implementing these interfaces with different technologies, such as for example USB, IDE, S-ATA or Flash interface technologies.

The second transfer means 20 will be used to transfer the digital data item from the control means 30 to the second computer system B. This transfer means 20, symmetrically equivalent to the first transfer means 10, can carry out some or all of the functions of the first transfer means 10, and integrate a second exchange means 21 and a second processing means 22 for this purpose. The physical connections $20_a$ and $20_b$ connecting the means 12, 22 and 30 follow the same principles as those of the first means 10. Similarly, the second processing means 22 can be produced in a way similar to the first processing means 12 and can carry out the same operations as the latter.

The control means 30 can write or read the data coming from one of the processing means 12 or 22. The reading or writing direction can be defined by switches 41, 42, and is indicated by the operating states R, W, and R', W', respectively in FIG. 2. These switches are used to change the reading rights of the various processing and control means 21, 22 and 30, in order to impose a direction of transfer of the digital data item.

In the present example, it is possible to set the switch 41 in a first state W, so that the exchange means 11 can only read the data coming from the computer system A, so that the processing means 12 can only read the data from the exchange means 11, and so that the control means 30 can only read the data coming from the processing means 12, in order to write them in a storage space 50 or 61. Similarly, it is possible to set the switch 42 in a state R' so that the processing means 22 can only read the data from the control means 30 and so that the exchange means 21 can only read the data from the processing means 22 and send them to the second computer system B, if required by the latter.

In this way, by means of operating the switches 41 and 42, the direction of transfer of the data is defined, whilst preventing any other operation, contributing an added level of security.

On the contrary, if it is desired this time to transfer the data in the other direction, the switch 42 can be set in a second state W', so that the exchange means can only read the data coming from the computer system B, so that the processing means 22 can only read the data from the exchange means 21, and so that the control means 30 can only read the data coming from the processing means 22, in order to write these data in a storage space 50 or 61. Similarly, the switch 41 can then be set in a state R so that the processing means 12 can only read the data from the control means 30 and so that the exchange means 11 can only read the data from the processing means 12 and send them to the first computer system A.

Finally, there can be a third state RW, respectively RW', for the switches 41, respectively 42, in order for the latter to authorize each of the means that it controls either to read or to write the data in the desired direction. If an operator sets these two switches 41, 42 in the states RW and RW', the security provided by setting the reading direction is removed, but the device remains protected by the other aspects described above.

The functioning of this secure transfer device will now be explained by means of its operating method.

Figure 3:
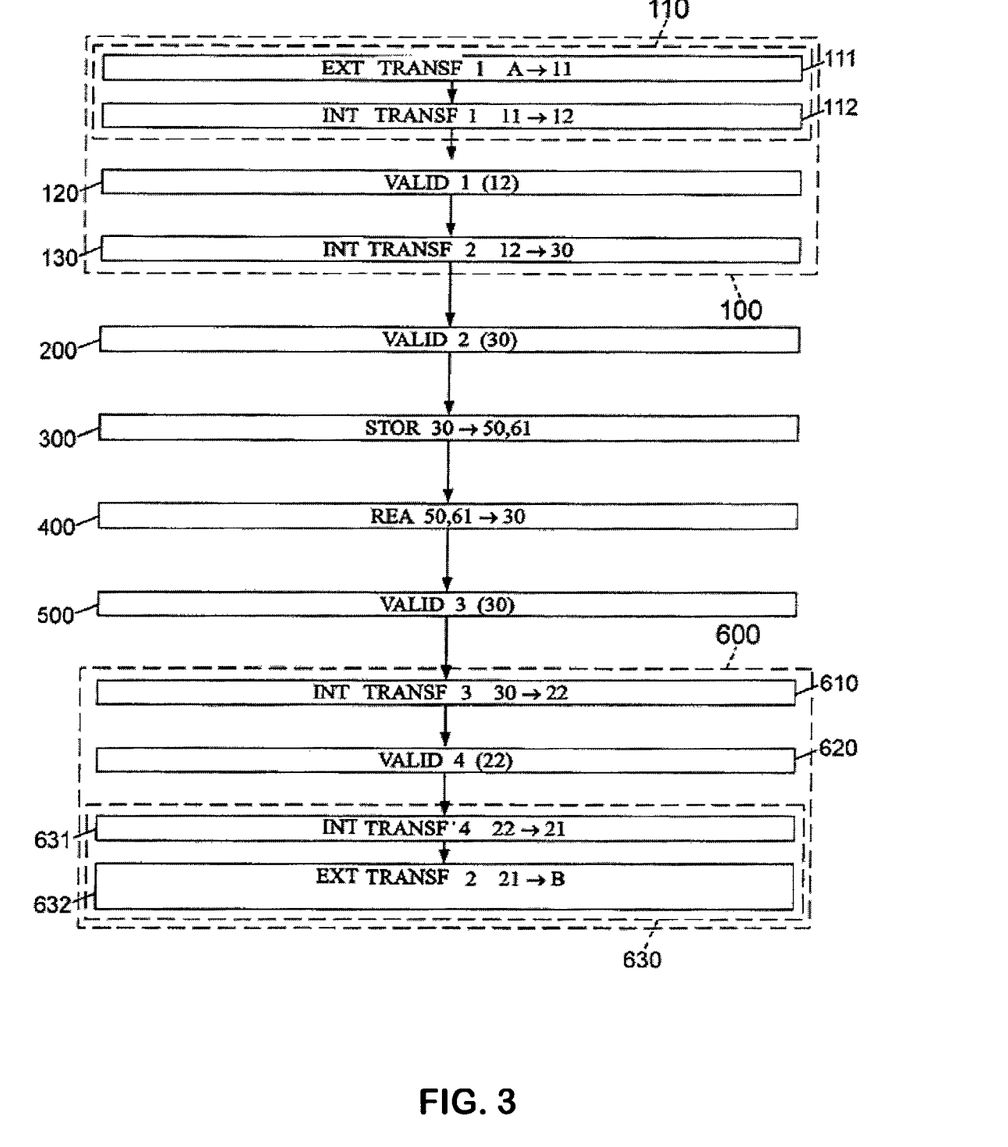
FIG. 3 shows the stages of a method according to an embodiment of the present invention.

FIG. 3 shows the stages of a method according to an embodiment of the present invention.

During a first transfer stage 100, a digital data item is transferred from a first computer system A to the control means 30 of the secure transfer device 1.

This stage 100 can be broken down into an initial transfer stage 110, during which the digital data item is transmitted from the first computer system to the first processing means 12, followed optionally by a stage of validation of the data item 120 at the level of the first processing means 12, then by an internal transfer stage 130, during which the digital data item is transmitted from the first processing means 12 to the control means 30.

The initial transfer stage 110 can itself be broken down into an external transfer stage 111, during which the digital data item is transmitted from the first computer system A to the first exchange means 11 of the device 1, followed by an internal transfer stage 112, during which the digital data item is transmitted from the exchange means 11 to the first processing means 12.

After this first transfer stage 100, a stage of validation 200 of the digital data item can take place at the level of the control means 30.

A stage 300 of writing the digital data item in a storage means, such as a means 50 inside the device 1 or a means 61 outside of the device 1, then follows.

Once the data item is stored in memory, it is then read by the control means 30, during a stage 400, at the request of the system intended to receive this data item, in this case the computer system B.

After this reading stage 400, a stage of validation 500 of the digital data item can again take place at the level of the control means 30.

Finally, another transfer stage 600 takes place, during which the digital data item is transferred from the control means 30 to a second computer system B.

This stage 600 can be broken down into an internal transfer stage 610, during which the digital data item is transferred from the control means 30 to the second processing means 22, followed optionally by a stage 620 of validation of the data item at the level of the second processing means 22, then by a final transfer stage 630, during which the digital data item is transmitted from the second processing means 22 to the second computer system B.

The final transfer stage 630 can itself be broken down into an internal transfer stage 631, during which the digital data item is transmitted from the second processing means 22 to the second exchange means 21 of the device 1, followed by an external transfer stage 632, during which the digital data item is transmitted from the second exchange means 21 to the second computer system B.

Each of the various intermediate transfers 111, 112, 130, 610, 631 and 632 described previously is managed by means of an interface of a particular type. A first idea of the present invention is to choose interfaces of different types, for example by using a different physical implementation technology, in order to prevent a malicious user, having taken control of the first computer system, from being able to attack the second computer system from the latter, or to be able to make use of the same type of vulnerability.

The fact of using such interfaces of different types will result in each element of the device 1 seeing only the elements which are adjacent to it, and not the other elements, which increases the security because each element of the device 1 does not have overall knowledge thereof.

Thus, for example, the exchange means 11 knows only the existence of the connection $10_a$ and of the connection to the computer system A. This means 11 does not see the other elements 12, 30, 22 and 21. It only causes data received from the system A to pass on to the connection $10_a$, which is a memory bus for example, and can optionally be informed by the latter of the successful or unsuccessful transfer of these data, without having access to greater detail.

In order to avoid the malicious user making use of the transferred data items themselves in order to attack the device 1 and the other computer systems, stages of validation 120, 200, 500 and 620 of the digital data item can be provided. Such a validation stage serves to verify a parameter linked to the data item and to authorize the progression of the latter further ahead in the direction of transfer only if this verification is positive.

Among the possible validations, it is for example possible to envisage a basic validation of the digital data item according to at least one parameter relative to at least one of said symbols of the data item. In fact, any digital data item will be constituted by a series of several symbols chosen from an alphabet. In this case it is possible to seek to check if the symbols of the received data item correspond to the authorized symbols, or if the digital data item contains a well-defined number of symbols. It can also be checked that the symbols of the data item comply with a previously defined pattern, i.e. that they correspond to a previously known format.

The validation can also consist in verifying one of the parameters relative to the metadata of the data item. By "metadata" is meant here any data subordinate to the digital data item. This can be, for example, the file format of the data item, the format of the title of the data item file, the size of the file, its date of creation and/or modification, its owner, its original directory, digital signature of the file, etc. The validation can also incorporate a data encryption or decryption stage.

The data item will only be validated if the validation criteria defined in one of the means 12, 22 or 30 is complied with. As already stated+ previously, in case of non-validation of the data item, the latter cannot continue its transfer in a particular embodiment.

In a first variant, in the case of non-validation of the data item, the digital data item can be modified, as well as, optionally, the metadata which are associated with it, in order to make them harmless.

In a second variant, in the case of non-validation of the data item, the digital data item can continue its transfer without being modified, but then the destination computer system B of this data item must be informed that the latter does not comply with the validation criteria.

The stages of validation 120, 200, 500 and 620 can be carried out by the different means 12, 22 and 30. They can furthermore consist of one, some, or even all of the validations described previously, or of any combination of these validations, independently from each other.

The fact of using several validation methods of different types, during different validation stages 120, 200, 500 or 620, can strengthen the overall validation of the digital data item or make it better adapted according to the uses of the device.

As previously seen, the means 12, 22 and 30 can be implemented similarly and can carry out similar validations. It is however possible to envisage, in order to increase speed and security, to use for the processing means 12 and 22 components having less capacity than for the control means 30, which itself must manage access to the storage means in all cases. In such a case, the processing means 12 and 22 can be confined to carrying out the basic validation operations described above whereas the control means itself will be able to carry out at least one validation operation relative to one or more metadata of the data item to be transferred, for example.

Another idea of the present invention is to use interfaces which are simple and limited to a set of low-level routines, such as reading and writing operations. A malicious user will not therefore be able to highjack the interface itself in order achieve his aims.

To this end, it can be decided that one or certain transfers 112, 130, 610 or 631, or even all of these transfers, are managed by an interface allowing only a list of defined functions, such as data reading or data writing operations for example. The reading or writing direction of each interface can be controlled, if necessary, by means of switches such as the switches 41 and 42 in FIG. 2, in order to authorize the transfer of data in one direction only, from the first computer system to the second computer system for example. A possible malicious user, having taken control of the first computer system, will thus be unable to retrieve confidential data originating from the second computer system.

Figure 4A:
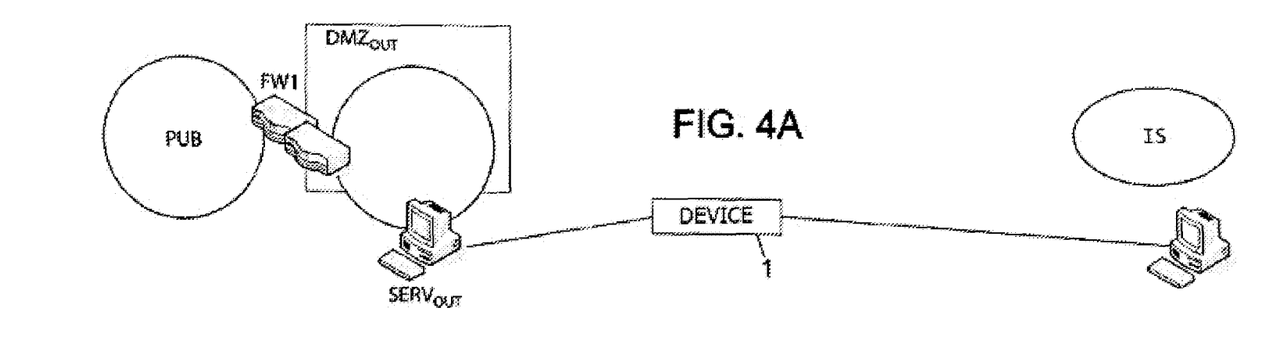
FIGS. 4A, 4B and 4C show examples of secure exchange architecture using the secure transfer device according to an embodiment of the present invention.
Figures 4B, 4C:
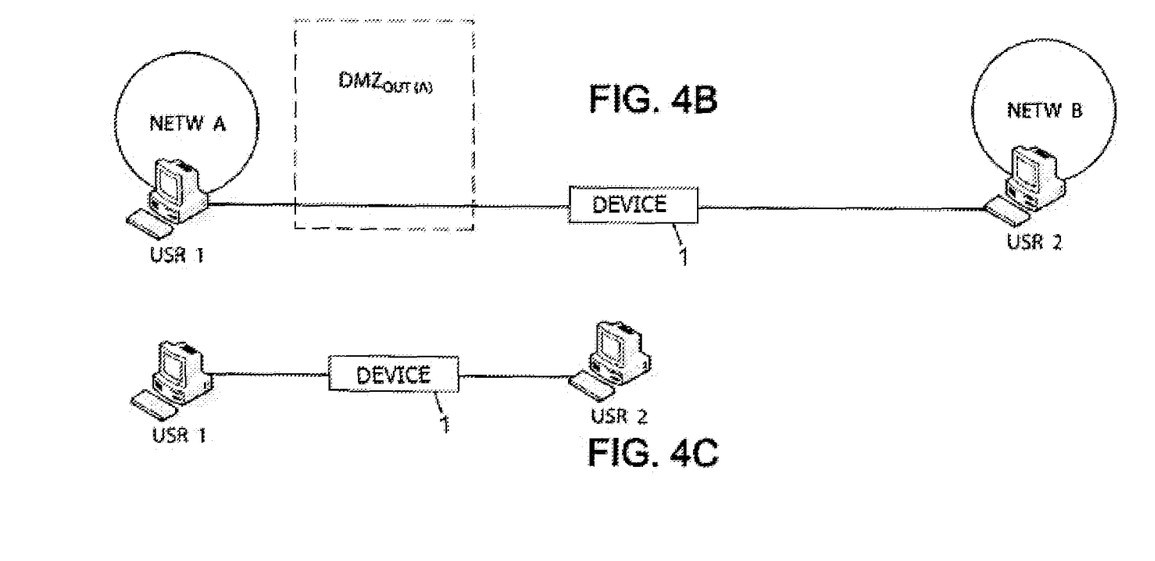

FIGS. 4A, 4B and 4C show the advantage contributed by the use of a secure transfer device such as described above.

For example, instead of having a complex structure with three zones such as described in the case of the "ideal" architecture of FIG. 1A, with all of the associated servers and firewalls, the secure transfer device 1 can for example by itself replace the internal exchange zone $DMZ_{int}$ and the extended exchange zone $DMZ_{ext}$, whilst providing a level of security which is at least equivalent, constituting a considerable simplification of the security architecture, as well as its use. Such a solution is shown in FIG. 4A.

Considering now the other case of "conventional" architecture shown in FIG. 1B, in which respective exchange zones $DMZ_{out}(A)$, $DMZ_{out}(B)$ are used to protect two users USR1 and USR2, one of these exchange zones can very well be replaced by a device of the present invention, for example the exchange zone $DMZ_{out}(B)$ such as shown in FIG. 4B. It can even be envisaged, in an extreme case, to completely dispense with an exchange zone and to connect the users to each other directly, by means of the device of the present invention, as shown in FIG. 4C.

Another significant advantage of the solution proposed by the present invention is the "plug & play" functionality of the device of the invention, which is able to operate with any type of computer system, independently from their software configuration.

The present invention is of course not limited to the embodiment described above by way of example; it extends to other variants.

Again, it is possible to envisage connecting any number of computer systems to the input and to the output of the secure transfer device, in which case the exchange means 11, 12 must be adapted according to the respective number of computer systems at the input and at the output of the transfer device 1.

The present invention has a particularly advantageous application to the secure transfer of data in vulnerable zones. Without however being limited thereby, it can be applied particularly advantageously, to the transfer of data collected by sensors to a computer system for processing these data.

The device of the present invention can also be used to replace a transfer by USB key or by floppy disk, whilst providing in addition a certain level of security on the physical level and an optimum ease of use because it is not necessary to carry out manual operations of copying, moving a physical medium and recopying, for example.

Finally, the device of the present invention can be used for the publication of data in zones with different levels of security.

For example, the device of the invention can be used for transferring data from a first zone having a higher security, for example data sampled by a sensor or relating to the operating state of sensitive equipment, to a second zone having a lower security, or even a zone which is completely open to the public, in order to publish these data. This can be done without the system of the zone with a lower level of security having access to the zone with a higher level of security, by means of the present invention.

Conversely, the device of the present invention can be used as a "safety lock" for validation of data originating from a zone having a lower level of security and intended for a zone having a higher level of security. The device will verify and validate the data and will only transmit them to the zone having a higher level of security if these data comply with the criteria defined in the device.

The invention claimed is:

1. A method for securely transferring an item of digital data, from at least a first computer system to at least a second computer system, said method comprising:
    performing a first transfer of the digital data item originating from the first computer system to a controller of a transfer device;
    writing the digital data item received by the controller in a data store;
    reading the digital data item stored in the data store by the controller; and
    performing a second transfer, managed independently from the first transfer, of the digital data item from the controller to the second computer system;
wherein the first transfer comprises:
    providing, in a first internal transfer stage, managed by at least a first internal transfer interface of the transfer device, the digital data item from the first computer system to a first processor belonging to the transfer device; and
    providing, in a second internal transfer stage, managed by a second internal transfer interface of the transfer device, independent from said first internal transfer interface, the digital data item from the first processor to the controller; and
wherein the second transfer comprises:
    providing, in a third internal transfer stage, managed by a third internal transfer interface of the transfer device, the digital data item coming from the controller to a second processor belonging to the transfer device, the second processor being distinct from the first processor; and
    providing, in a final transfer stage, managed by at least a fourth internal transfer interface of the transfer device and independent of said third internal transfer interface, of the digital data item from said second processor to the second computer system.

2. The method of claim 1, wherein the first internal transfer interface uses a transfer technology which is different from the second internal transfer interface.

3. The method of claim 1, wherein the first internal transfer stage comprises:
    providing, in a first external transfer stage, managed by at least a first transfer interface outside of the transfer device, the digital data item from the first system to a first exchange device belonging to the transfer device; and
    providing, in a first internal transfer stage, managed by a first internal transfer interface of the transfer device and independent from said first external transfer interface, the digital data item from said first exchange device to the first processor.

4. The method of claim 1, wherein the third internal transfer interface uses a transfer technology which is different from the fourth internal transfer interface.

5. The method of claim 1, wherein the final transfer stage comprises:
    providing, in a fourth internal transfer stage, managed by a fourth internal transfer interface of the transfer device and independent from said third internal transfer interface, the digital data item from the second processor to a second exchange device belonging to the transfer device; and
    providing, in a second external transfer stage, managed by at least a second transfer interface outside of the transfer device, the digital data item from said second exchange device to the second computer system.

6. The method of claim 1, wherein the digital data item is constituted by a plurality of symbols, the method comprising, between at least one of: a) the first internal transfer stage and the second internal transfer stage, or b) between the first transfer and the writing stage, at least one stage of validation of the data item according to at least one of: a) at least one parameter relative to at least one of said symbols of the data item, b) or according to a parameter relative to at least one item of metadata relating to said data item.

7. The method of claim 1, wherein each transfer interface can carry out only writing or reading operations of the digital data item.

8. The method of claim 1, in which the digital data item is constituted by a plurality of symbols, wherein the method comprises, between the third internal transfer stage and the final transfer stage, at least one stage of validation of the data item according to at least one of: a) at least one parameter relative to at least one of said symbols of the data item, or b) according to a parameter relative to at least one item of metadata relating to said data item.

9. A device for securely transferring an item of digital data between at least a first computer system and at least a second computer system, comprising:
    a controller connectable to at least one data store,
    a first transfer device, connected to said controller, capable of receiving the digital data item coming from the first computer system and of transmitting it to the controller,
    a second transfer device, connected to said controller, capable of receiving the digital data item from said controller, in order to transmit it to the second computer system, and managed independently from said first transfer device, and
    wherein the first transfer device comprises a first processor, capable of receiving the digital data item coming from the first computer system via a first connection managed by a first internal transfer interface, and connected to the controller via a second connection managed by a second internal transfer interface independently from said first internal transfer interface; and
    wherein the second transfer device comprises a second processor, connected to the controller by means of a third connection managed by a third internal transfer interface, and capable of sending the digital data item to the second computer system via a fourth connection managed by a fourth internal transfer interface independently from said third internal transfer interface.

10. The device of claim 9, wherein the first transfer device comprises a first exchange device, connected to the first processor via said first connection, and capable of receiving the digital data item coming from the first computer system via a first external transfer interface, managed independently from said first internal transfer interface.

11. The device of claim 10, further comprising a first switch, which enables to select between at least two operating states, the first operating state being a state in which the first processor is capable of receiving the data item only from the first exchange device and of transmitting the data item only to the controller, and the second operating state being a state in which the first processor is capable of receiving the data item only from the controller and of transmitting the data item only to the first exchange device.

12. The device of claim 9, wherein the second transfer means further comprises a second exchange device, connected to the second processor via said fourth connection, and capable of sending the digital data item to the second computer system via a second external transfer interface, managed independently from said fourth internal transfer interface.

13. The device of claim 12, further comprising a second switch, which enables selecting between at least two operating states, the first operating state being a state in which the second is capable of receiving a data item only from the second exchange device and of transmitting a data item only to the controller, and the second operating state being a state in which the second is capable of receiving a data item only from the controller and of transmitting a data item only to the second exchange device.

14. The device of claim 9, further comprising at least one data store, connected to said controller and capable of storing said digital data item.

15. The device of claim 9, further comprising at least one connector, connected to said controller and connectable to at least one data store outside of the transfer device, in order to store the digital data item there.

16. The device of claim 9:
  wherein the first transfer device comprises a first exchange device, connected to the first processor via said first connection, and capable of receiving the digital data item coming from the first computer system via a first external transfer interface, managed independently from said first internal transfer interface;
  wherein the second transfer means further comprises a second exchange device, connected to the second processor via said fourth connection, and capable of sending the digital data item to the second computer system via a second external transfer interface, managed independently from said fourth internal transfer interface;
  further comprising a first switch, which enables to select between at least two operating states, the first operating state being a state in which the first processor is capable of receiving the data item only from the first exchange device and of transmitting the data item only to the controller, and the second operating state being a state in which the first processor is capable of receiving the data item only from the controller and of transmitting the data item only to the first exchange device; and
  further comprising a second switch, which enables selecting between at least two operating states, the first operating state being a state in which the second is capable of receiving a data item only from the second exchange device and of transmitting a data item only to the controller, and the second operating state being a state in which the second is capable of receiving a data item only from the controller and of transmitting a data item only to the second exchange device.

17. A non-transitory computer readable storage medium having stored thereon a computer program comprising program instructions, the computer program being loadable into a data-processing unit and operative when the computer program is run by the data-processing device to cause the data-processing unit to carry out the following steps:
  performing a first transfer of an item of digital data originating from a first computer system to a controller of a transfer device,
  writing the digital data item received by the controller in a data store,
  reading the digital data item stored in the data store by the controller, and
  performing a second transfer, managed independently from the first transfer, of the digital data item from the controller to a second computer system;
  wherein the first transfer comprises:
    providing, in a first initial transfer stage, managed by at least a first internal transfer interface of the transfer device, the digital data item from the first computer system to a first processor belonging to the transfer device; and
    providing, in a second internal transfer stage, managed by a second internal transfer interface of the transfer device, independent from said first internal transfer interface, the digital data item from the first processor to the controller; and
  wherein the second transfer comprises:
    providing, in a third internal transfer stage, managed by a third internal transfer interface of the transfer device, the digital data item coming from the controller to a second processor belonging to the transfer device, the second processor being distinct from the first processor; and
    providing, in a final transfer stage, managed by at least a fourth internal transfer interface of the transfer device and independent of said third internal transfer interface, of the digital data item from said second processor to the second computer system.

* * * * *